United States Patent
Yoon et al.

(10) Patent No.: US 7,392,292 B2
(45) Date of Patent: Jun. 24, 2008

(54) METHOD FOR MANAGING CRM DATA, CRM SERVER AND RECORDING MEDIUM THEREOF

(75) Inventors: Ho-seok Y Yoon, Seoul (KR); Hyo-sik Bang, Seongnam-si (KR); Eun-young Choi, Seoul (KR); Su-hyun Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 741 days.

(21) Appl. No.: 10/254,535

(22) Filed: Sep. 26, 2002

(65) Prior Publication Data

US 2003/0110256 A1 Jun. 12, 2003

(30) Foreign Application Priority Data

Dec. 11, 2001 (KR) .............................. 2001-78176

(51) Int. Cl.
*G06F 15/16* (2006.01)
(52) U.S. Cl. .................... 709/217; 709/203; 709/219; 709/227
(58) Field of Classification Search ................ 709/203, 709/217, 219, 227
See application file for complete search history.

(56) References Cited

U.S. PATENT DOCUMENTS 5,901,287 A * 5/1999 Bull et al. ................... 709/218

| 2001/0027408 | A1 | 10/2001 | Nakisa | |
|---|---|---|---|---|
| 2002/0026394 | A1* | 2/2002 | Savage et al. | 705/34 |
| 2002/0049610 | A1* | 4/2002 | Gropper | 705/1 |
| 2002/0049626 | A1* | 4/2002 | Mathias et al. | 705/10 |
| 2002/0073019 | A1* | 6/2002 | Deaton | 705/38 |
| 2003/0097358 | A1* | 5/2003 | Mendez | 707/3 |
| 2004/0250085 | A1* | 12/2004 | Tattan et al. | 713/186 |
| 2006/0118619 | A1* | 6/2006 | Hulst et al. | 235/380 |

FOREIGN PATENT DOCUMENTS

| CN | 1317745 A | 10/2001 |
|---|---|---|
| GB | 2361081 | 10/2001 |
| JP | 10-124428 A | 5/1998 |
| JP | 10-164173 A | 6/1998 |
| JP | 11-96164 A | 4/1999 |

* cited by examiner

*Primary Examiner*—Phuoc H Nguyen
(74) *Attorney, Agent, or Firm*—Sughrue Mion, PLLC

(57) ABSTRACT

A method for managing customer relationship management (CRM) data is provided. Log data including Internet address information associated with a user's terminal is received from the user's terminal via a communication network. User's CRM data is generated using the log data initially received from the user's terminal and is updated using the log data received from the user's terminal in which, the CRM data has been already generated. The generated and updated CRM data is transmitted to the user's terminal via the communication network such that the CRM data is stored in the user's terminal. An Internet user need not input CRM data whenever the Internet user uses Internet services and the user's own favorite information is obtained from a CP server which provides services suitable for each user using the CRM data without requiring a CRM solution having additional costs.

12 Claims, 7 Drawing Sheets

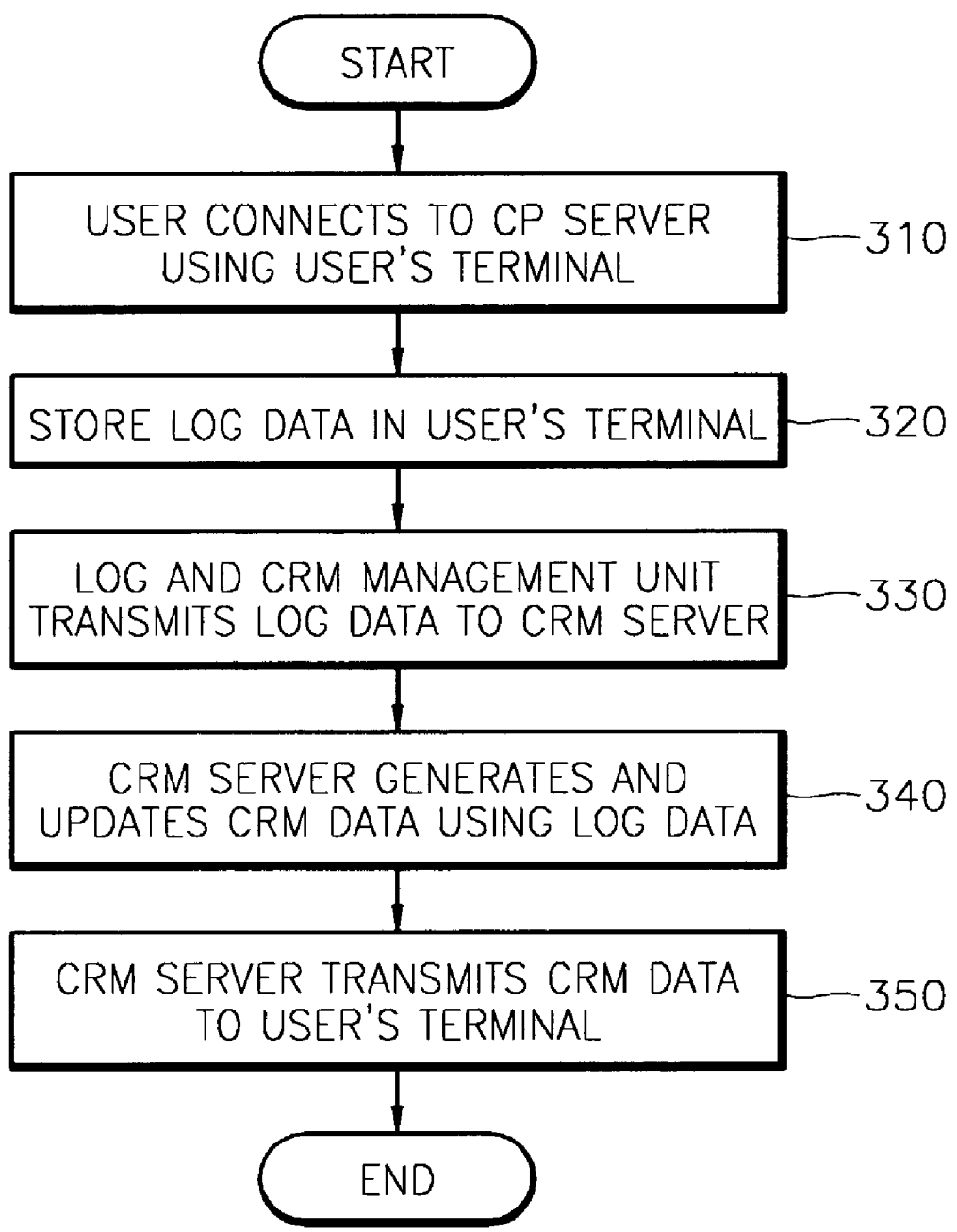

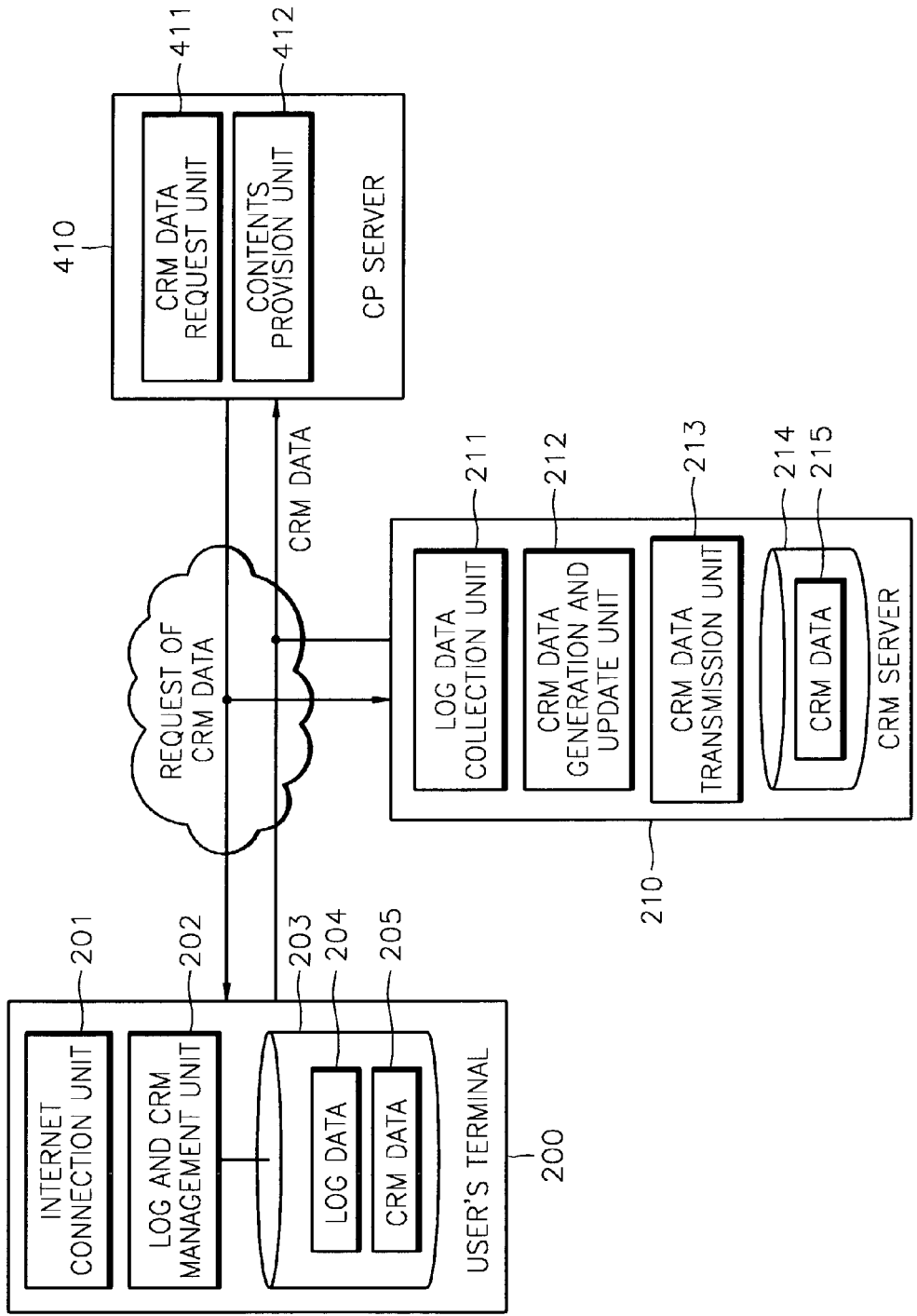

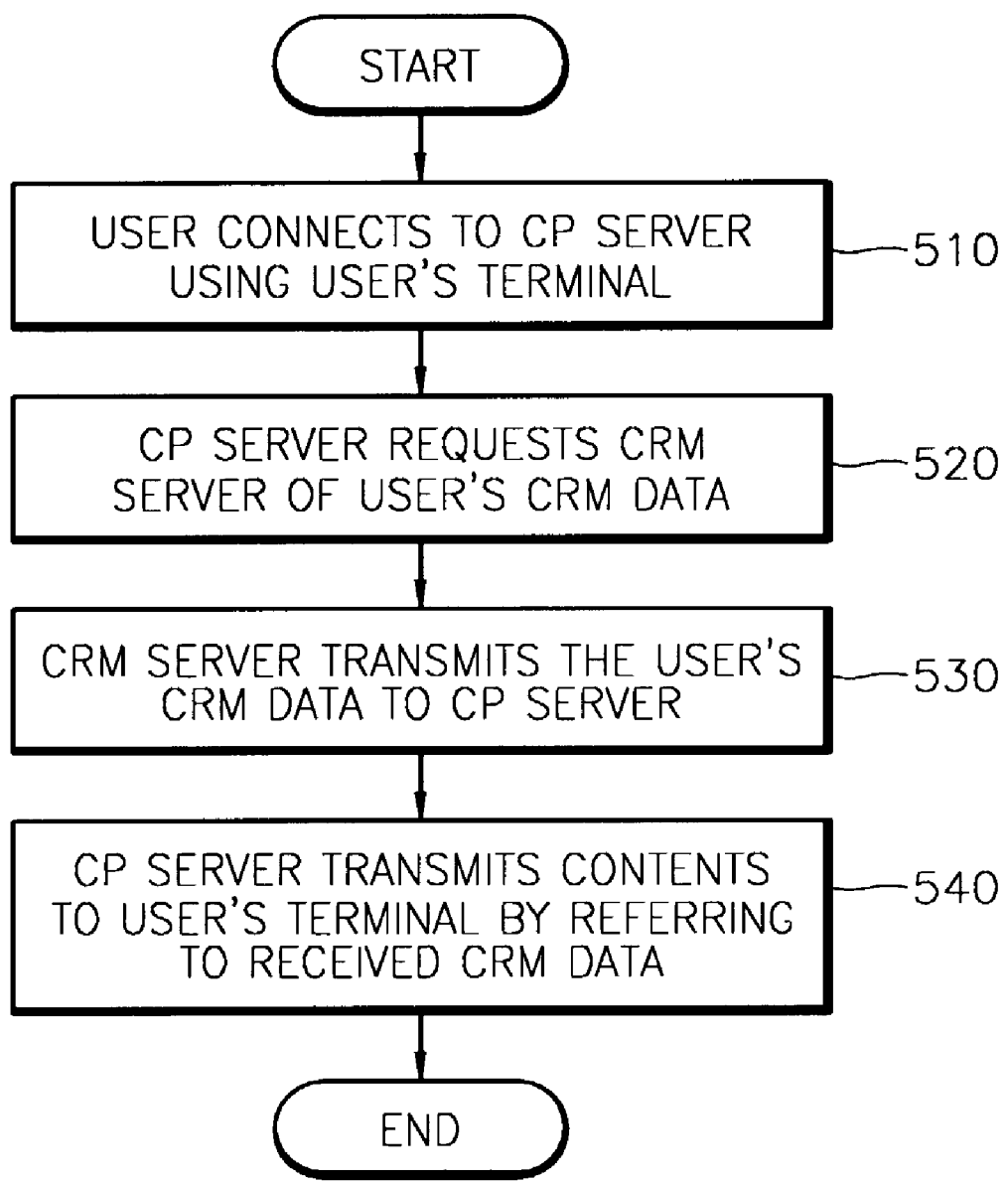

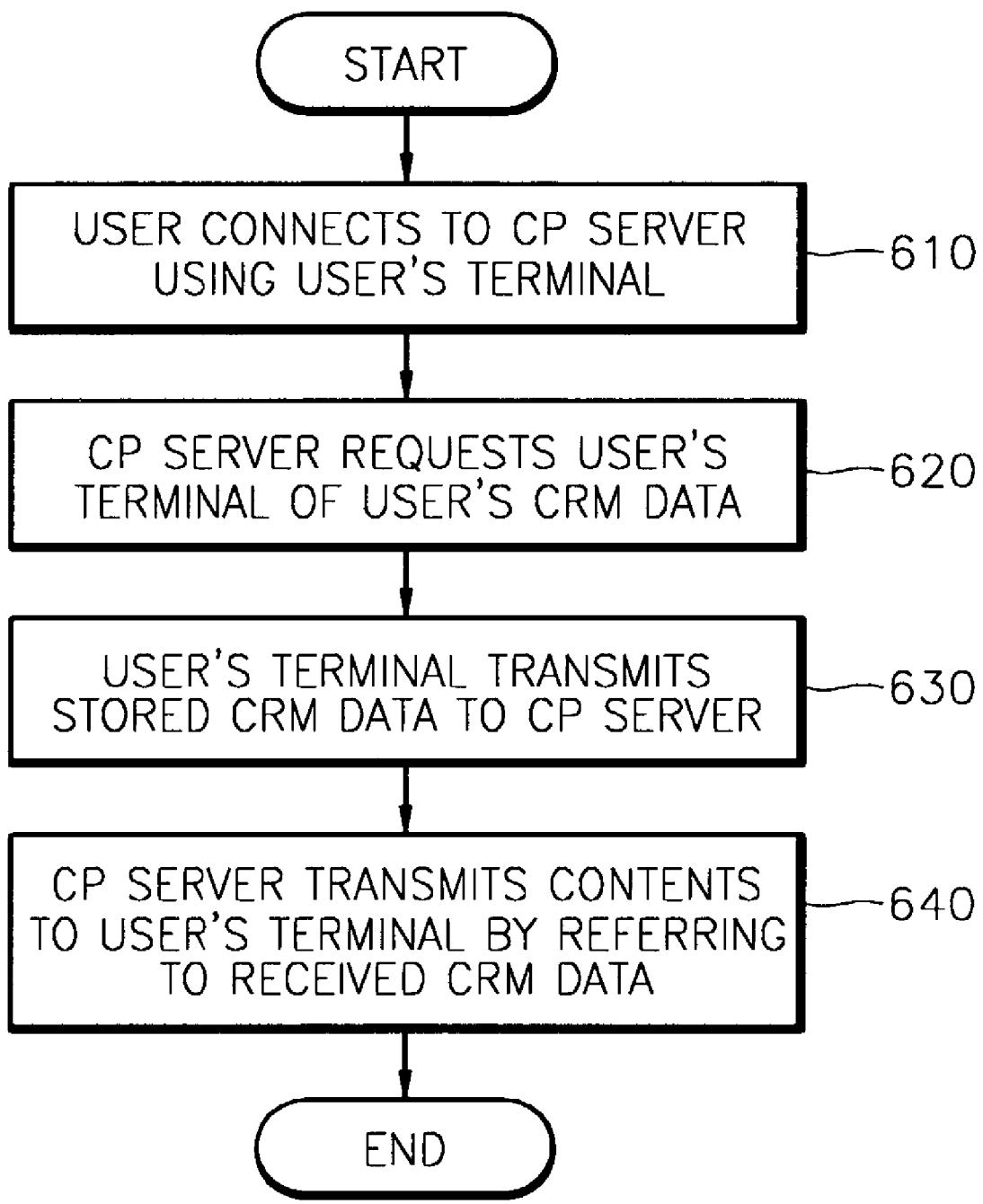

METHOD FOR MANAGING CRM DATA, CRM SERVER AND RECORDING MEDIUM THEREOF

BACKGROUND OF THE INVENTION

1. Field of the Invention

The present invention relates to a method for generating and managing customer relationship management (CRM) data, and more particularly, to a method for generating and managing CRM data using Internet connection log information stored in a user's terminal, and a CRM server. The present application is based on Korean Patent Application No. 2001-78176, filed Dec. 11, 2001, which is incorporated herein by reference.

2. Description of the Related Art

Customer relationship management (CRM) is a term which relates to methods or software required by an enterprise to manage customer relationships. In this specification, CRM data includes data required for customer management, i.e., user personal information and all other user information which content providers on the Internet require for customer management.

In general, when a user connects to a web site provided by a content provider and becomes a member, the content provider receives the user's personal information and retains the user's information. Unless the user connects to the web site and updates his or her own personal information when the user's personal information changes, the content provider has only the information initially inputted by the user, and thus cannot easily provide content suitable for the user's changed personal information. If the content provider requests the user who connects to the web site to update the user's information, this causes much inconvenience to the user. As a result, there are many cases where the user does not update the information.

Since the user should input the same information when visiting various web sites, the user regards the procedure of inputting personal information as a nuisance and may decline to become a member, or may terminate membership, of some web sites. As a result, content providers may lose an opportunity to collect users' information.

In addition, there are limitations in analyzing users' overall tendencies using users' personal information obtained from a single web site.

To profitably utilize CRM data through a CRM system such as that shown in FIG. 1A, entails many additional costs for a small content provider.

As shown in FIG. 1B, even though an additional CRM server, i.e., a server which analyzes and stores users' tendencies using users' CRM data, collects users' information from a content provider server, generates CRM data, and the content provider server uses the CRM data later, there are limitations in analyzing users' overall tendencies using the CRM data.

SUMMARY OF THE INVENTION

To solve the above problems, it is an object of the present invention to provide a method for generating and managing a customer relationship management (CRM) data using Internet connection log information stored in a user's terminal, and a CRM server, in which an Internet user need not input CRM data whenever the Internet user uses Internet services and services suitable for each user are provided using CRM data without constituting a CRM solution requiring additional costs.

Accordingly, to achieve the above object, according to one aspect of the present invention, there is provided a method for managing customer relationship management (CRM) data. The method includes receiving log data including Internet address information connected to a user's terminal from the user's terminal via a communication network, generating user's CRM data using the log data initially received from the user's terminal and updating the user's CRM data using the log data received from the user's terminal in which the CRM data has been already generated, and transmitting the generated and updated CRM data to the user's terminal via the communication network such that the CRM data is stored in the user's terminal.

The method may further include transmitting a log transmission program to be installed in the user's terminal to the user's terminal via the communication network such that the user's terminal transmits the log data including Internet address information connected to the user's terminal to a CRM server.

In order to achieve the above object, according to another aspect of the present invention, there is provided a method for managing customer relationship management (CRM) data. The method includes receiving log data including Internet address information connected to a user's terminal from the user's terminal via a communication network, generating, updating and storing the user's CRM data using the log data, transmitting the CRM data to the user's terminal via the communication network such that the CRM data is stored in the user's terminal, and transmitting the stored CRM data to a content provider (CP) server via the communication network if a request for the CRM data is received from the CP server connected to the user's terminal via the communication network.

In order to achieve the above object, according to another aspect of the present invention, there is provided a method for managing customer relationship management (CRM) data. The method includes receiving log data including Internet address information connected to a user's terminal from the user's terminal via a communication network through a CRM server, generating, updating and storing the user's CRM data using the log data through the CRM server, transmitting the CRM data to the user's terminal via the communication network such that the CRM data is stored in the user's terminal through the CRM server, requesting the user's terminal of the CRM data via the communication network if a request for contents is received from the user's terminal via the communication network through the CP server, and transmitting the contents to the user's terminal via the communication network if the requested CRM data is received from the user's terminal via the communication network through the CP server.

In order to achieve the above object, according to another aspect of the present invention, there is provided a customer relationship management (CRM) server. The CRM server includes a log data collection unit which receives log data including Internet address information connected to a user's terminal from the user's terminal via a communication network, a CRM data generation and update unit which generates the user's CRM data using the log data initially received from the user's terminal through the log data collection unit, updates the user's CRM data using the log data received from the user's terminal in which the CRM data has been already generated, and stores the CRM data in a data storage unit, a CRM data transmission unit which transmits the generated and updated CRM data to the user's terminal via the communication network such that the CRM data is stored in the user's terminal, and transmits the CRM data to a content provider (CP) server via the communication network if a request for the CRM data is received from the CP server connected to the user's terminal via the communication network, and a data storage unit in which the CRM data generated and updated by the CRM data generation and update unit is stored.

It is preferable that the log data collection unit transmits a log transmission program to be installed in the user's terminal to the user's terminal via the communication network such that the user's terminal transmits the log data including Internet address information connected to the user's terminal to the CRM server.

Here, as examples of the user's terminal are a personal computer (PC), a personal digital assistant (PDA), and a mobile phone. However, it is contemplated that the invention may employ any device capable of communicating with other devices.

In order to achieve the above object, according to another aspect of the present invention, there is provided a computer readable recording medium on which is recorded a program for implementing the method for managing CRM data.

BRIEF DESCRIPTION OF THE DRAWINGS

The above object and advantages of the present invention will become more apparent by describing in detail preferred embodiments thereof with reference to the attached drawings in which:

FIG. 3 is a flow chart illustrating an example of a manner of generating CRM data according to the present invention;

FIG. 4 illustrates flow of CRM data in the example shown in FIG. 2;

FIG. 5 is a flow chart illustrating an example of a manner in which CRM data is provided by a CRM server according to the present invention; and FIG. 6 is a flow chart illustrating an example of a manner in which CRM data is provided by a user's terminal according to the present invention.

DETAILED DESCRIPTION OF EXEMPLARY EMBODIMENTS

The structure and operation of the present invention will be described in detail hereinafter with reference to the accompanying drawings.

Figure 1A:
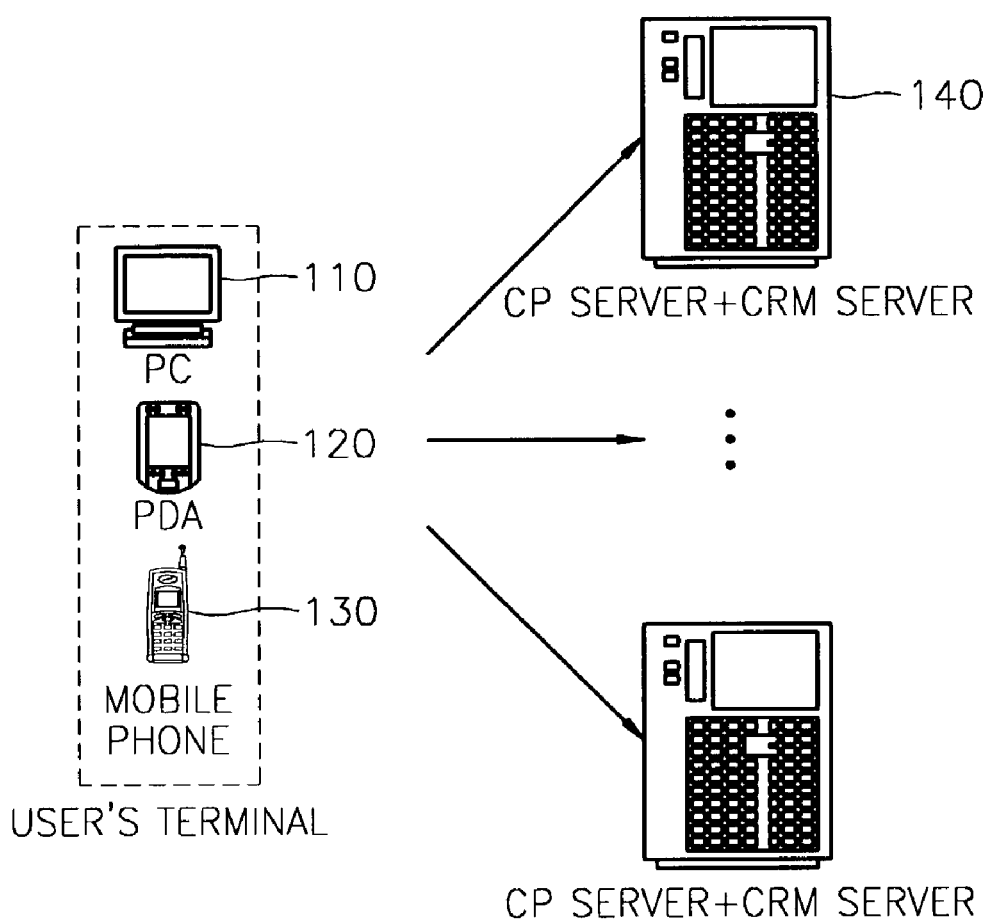
FIGS. 1A and 1B illustrate a conventional method for managing customer relationship management (CRM) data.
Figure 1B:
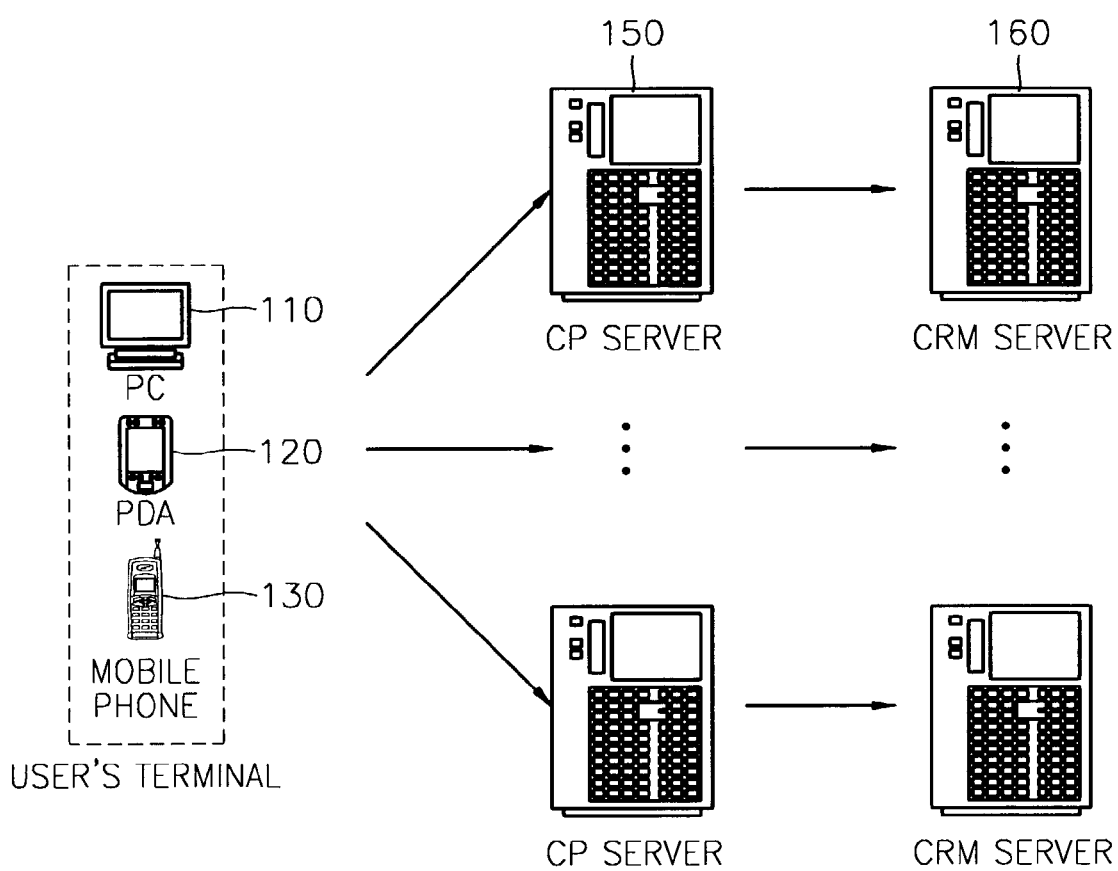
Figure 2:
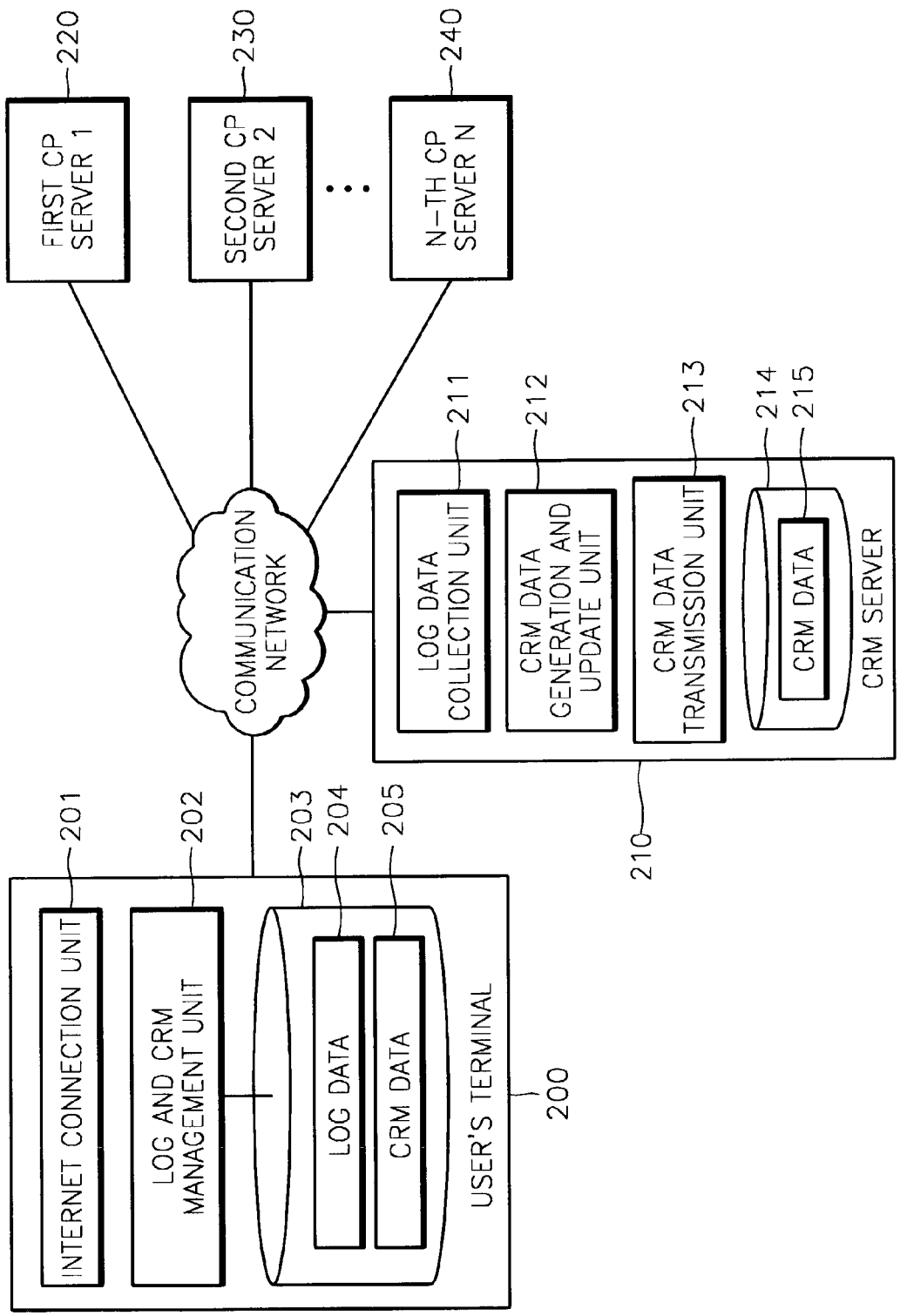
FIG. 2 illustrates an example of a system for managing CRM data according to the present invention.

FIG. 2 illustrates an example of a system for managing customer relationship management (CRM) data according to the present invention. The system includes a user's terminal 200, a CRM server 210, a first content provider (CP) server 220, a second CP server 230, . . . , and an N-th CP server 240. The user's terminal 200 includes a device capable of communicating with other devices. Such a device may be, for example, one of a personal computer (PC) which allows a user to connect to the Internet, a personal digital assistant (PDA), and a mobile phone. The CRM server 210 is a specialized server that manages only CRM data. The CP servers 220, 230, . . . , 240 provide contents to the user. In the system, the user's terminal 200, the CRM server 210, the first CP server 220, the second CP server 230, . . . , and the N-th CP server 240 are connected to one another via a communication network. The communication network preferably includes the Internet and may include other networks such as local area networks (LANs), wide area networks (WANs), public switched telephone networks (PSTNs), public switched data networks (PSDNs), cable TV networks, and wireless communication networks.

The user's terminal 200 is a traditional communication terminal preferably including a CPU, memory such as ROM and RAM, a display unit, an inputting unit such as a keypad, and a data storage unit. However, in describing the structure of the user's terminal 200 shown in FIG. 2, an explanation will be given based on functions related to the present invention.

The user's terminal 200 includes an Internet connection unit 201, a log and CRM management unit 202, and a data storage unit 203 in which log data 204 and CRM data 205 are stored.

The Internet connection unit 201 allows the user to connect to the Internet via a communication network. The data storage unit 203 stores the log data 204 including data such as Internet connection addresses, when the user connects to a plurality of web sites using the user's terminal 200, and the CRM data 205 received from the CRM server 210. The log and CRM management unit 202 transmits the log data 204 stored in the data storage unit 203 to the CRM server 210, receives the CRM data 205 from the CRM server 210 and transmits the CRM data 205 stored in the data storage unit 203 to the CP servers 220, 230, . . . , 240 by request of the CP servers 220, 230, . . . , 240.

The CRM server 210 may be a conventional PC or computer workstation having web server applications, sufficient memory and processing capabilities. In FIG. 2, the CRM server 210 will be described based on functions related to the present invention.

The CRM server 210 includes a log data collection unit 211, a CRM data generation and update unit 212, a CRM data transmission unit 213, and a data storage unit 214 in which CRM data 215 is stored.

The log data collection unit 211 collects log data stored in the data storage unit 203 of the user's terminal 200 and transmits a log transmission program to be installed in the user's terminal 200 to the user's terminal 200 via a communication network so as to collect the log data, for example, such that the user's terminal transmits the log data stored in the data storage unit 203 to the CRM server 210. Then, the log transmission program may be installed in the user's terminal 200 and may be part of the log and CRM management unit 202.

The CRM data generation and update unit 212 generates the CRM data 215 using the log data initially received from the user's terminal 200 and stores the CRM data 215 in the data storage unit 214. If log data is received from the user's terminal 200 in which the CRM data 215 has been already generated, the CRM data generation and update unit 212 updates the CRM data 215 using the log data and stores the updated CRM data 215 in the data storage unit 214.

The CRM data transmission unit 213 transmits the generated or updated CRM data 215 stored in the data storage unit 214 to the user's terminal 200 and transmits the CRM data 215 to the CP servers 220, 230, . . . , 240 by request of the CP servers 220, 230, . . . , 240.

An example of a step of generating CRM data and storing the CRM data in the user's terminal 200 and the CRM server 210 according to the present invention will be described with reference to FIG. 3.

In step 310, the user connects to the CP server on the Internet via the communication network using the user's terminal 200. In step 320, the log data such as an Internet connection address of the CP server is stored in the data storage unit 203 of the user's terminal 200.

In step 330, the log and CRM management unit 202 transmits the log data to the CRM server 210 via the communication network whenever the log data 204 is stored in the data storage unit 203. For example, this may be implemented by installing the log transmission program transmitted from the log data collection unit 211 in the user's terminal 200. The log transmission program may be part of the log and CRM management unit 202 of the user's terminal 200.

In step 340, if the CRM data generation and update unit 212 receiving the log data 204 initially receives log data from the user's terminal 200, the CRM data generation and update unit 212 generates CRM data 215 using the log data 204. If the CRM data generation and update unit 212 receives log data from the user's terminal 200 in which the CRM data 215 has been already generated, the CRM data generation and update unit 212 updates the CRM data using the log data. The generated and updated CRM data 215 is stored in the data storage unit 214.

In step 350, the CRM data transmission unit 213 transmits the CRM data 215 stored in the data storage unit 214 to the user's terminal 200 via the communication network such that the generated CRM data 215 is stored in the user's terminal 200.

In this way, the CRM server 210 generates and updates the CRM data using the log data of the user's terminal 200 such that the CRM data is generated and updated to track the user's Internet activity using the user's Internet connection information. As a result, the user's information can be immediately updated.

Since the user's terminal 200 and the CRM server 210 have the updated user's CRM information, a CP server can request the CRM data from either the user's terminal 200 or the CRM server 210 so as to provide appropriate services or contents to the user.

FIG. 4 illustrates the flow of CRM data in the example shown in FIG. 2. The structures of the user's terminal 200 and the CRM server 210 are the same as those of FIG. 2. A CP server 410 includes a CRM data request unit 411 and a contents provision unit 412.

The CRM data request unit 411 requests the user's terminal 200 or the CRM server 210 for the CRM data so that appropriate services or contents are provided to the user when services or contents are requested from the user's terminal. The contents provision unit 412 provides the appropriate services or contents to the user by referring to the received CRM data.

A step in which CRM data is provided by a CP server according to the present invention will be described with reference to FIGS. 5 and 6. FIG. 5 illustrates an example of a step in which the CRM data is provided by the CRM server.

In step 510, the user connects to the CP server via the communication network using the user's terminal 200. In step 520, even though the user connects to the CP server and requests the CP server for desired contents or services and the user just connects to the CP server, the CRM data request unit 411 requests the CRM server for the user's CRM data so as to provide appropriate services or contents to the user.

In step 530, if the request for the CRM data is received, the CRM data transmission unit 213 transmits the CRM data 215 stored in the data storage unit 214 to the CP server 410 via the communication network. In step 540, the contents provision unit 412 transmits appropriate contents or service to the user's terminal 200 by referring to the received CRM data.

A step in which the CRM data is provided by the user's terminal 200 is shown in FIG. 6. A step in which the CRM data is received from the user's terminal 200 by request of the CP server is similar to the step in which the CRM data is received from the CRM server by request of the CP server.

In step 610, the user connects to the CP server via the communication network using the user's terminal 200. In step 620, even though the user connects to the CP server and requests the CP server for desired contents or services and the user just connects to the CP server, the CRM data request unit 411 requests the user's terminal 200 for the user's CRM data so as to provide appropriate services or contents to the user.

In step 630, if the request for the CRM data is received, the log and CRM management unit 202 transmits the CRM data 205 stored in the data storage unit 203 to the CP server 410 via the communication network. In step 640, the contents provision unit 412 transmits appropriate contents or service to the user's terminal 200 by referring to the received CRM data.

As described above, the CRM data generated using the log data stored in the user's terminal 200 exists in the user's terminal and the CRM server, and thus the CP server can request the user's terminal or the CRM server for the CRM data so as to provide appropriate contents or services to the user.

Furthermore, a computer readable recording medium according to the present invention can be embodied in a computer program. Also, the program can be stored in computer readable media, read and executed by a computer. The media can include ROMs, RAMs, CD-ROMs, magnetic tapes, floppy discs, and optical data storage units. The media is dispersed in a computer system connected to a network and can be stored and executed by computer readable codes. As an alternative to the media, the computer program can be stored in a transmission medium, such as carrier waves (i.e., transmission via the Internet).

As described above, according to the present invention, CRM data is continuously updated using log data stored in a user's terminal, and the updated CRM data is stored in a CRM server and the user's terminal such that an Internet user need not input the CRM data whenever the Internet user uses Internet services, and the user's own favorite information is obtained from a CP server and the CP server provides services suitable for each user using the CRM data without constituting a CRM solution requiring additional costs.

While this invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A method for managing customer relationship management (CRM) data, the method comprising:

receiving log data, including Internet address connection information on a plurality of web sites which a user's terminal is connected to via a communication network, from the user's terminal via the communication network;

generating user's CRM data using the log data initially received from the user's terminal and updating the user's CRM data using the log data received from the user's terminal in which the CRM data has been already generated, to track the user's internet activity using the user's internet address connection information;

transmitting the generated and updated CRM data to the user's terminal via the communication network such that the CRM data is stored in the user's terminal; and transmitting a log transmission program, to be installed in the user's terminal, to the user's terminal via the communication network such that the user's terminal transmits the log data, including Internet address information associated with the user's terminal, to a CRM server, wherein the CRM data comprises user personal information required by content providers for customer management and wherein the updated CRM data is shared with the content providers by the user's terminal.

2. The method of claim 1, wherein the user personal information comprises user contact information and wherein the transmitted, generated and updated CRM data is directly provided by the user's terminal to different internet content providers.

3. The method of claim 1, wherein a content relationship management (CRM) server receives the log data, including said Internet address connection information on the plurality of web sites to which the user terminal is connected to via the communication network, from the user's terminal via the communication network, wherein the CRM server generates the user's CRM data using the log data initially received from the user's terminal and updating the user's CRM data using the log data received from the user's terminal in which the CRM data has been already generated tracking the user's Internet activity using the user's Internet address connection information, wherein the CRM server and the user's terminal store the generated and updated CRM data.

4. The method according to claim 3, wherein the content providers request the CRM data from at least one of the CRM server and the user's terminal, wherein the CRM data further comprises internet activity using the Internet address connection information of the user, and wherein the CRM data is provided to the content providers for receiving contents from the content providers.

5. The method according to claim 4, wherein the CRM server is dedicated to customer relationship management and is independent from an Internet service and the content providers.

6. A method for managing customer relationship management (CRM) data, the method comprising:

receiving log data, including Internet address connection information associated on a plurality of web sites which a user's terminal is connected to via a communication network, from the user's terminal via the communication network;

generating, updating, and storing user's CRM data using the log data, to track the user's internet activity using the user's internet address connection information;

transmitting the CRM data to the user's terminal via the communication network such that the CRM data is stored in the user's terminal;

transmitting the stored CRM data to a contents provider (CP) server via the communication network if a request for the CRM data is received from the CP server connected to the user's terminal via the communication network; and transmitting a log transmission program, to be installed in the user's terminal, to the user's terminal via the communication network such that the user's terminal transmits the log data, including Internet address information associated with the user's terminal, to a CRM server, wherein the CRM data comprises user personal information required by content providers for customer management and wherein the updated CRM data is shared with the content providers by the user's terminal.

7. A method for managing customer relationship management (CRM) data, the method comprising:

receiving log data, including Internet address connection information on a plurality of web sited which a user's terminal is connected to via a communication network, from the user's terminal via the communication network through a CRM server;

generating, updating, and storing user's CRM data using the log data through the CRM server, to track the user's internet activity using the user's internet address connection information;

transmitting the CRM data to the user's terminal via the communication network such that the CRM data is stored in the user's terminal through the CRM server;

requesting the user's terminal for the CRM data via the communication network if a request for contents is received from the user's terminal via the communication network through the CP server;

transmitting the contents to the user's terminal via the communication network if the requested CRM data is received from the user's terminal via the communication network through the CP server; and transmitting a log transmission program, to be installed in the user's terminal, to the user's terminal via the communication network such that the user's terminal transmits the log data, including Internet address information associated with the user's terminal, to a CRM server, wherein the CRM data comprises user personal information required by content providers for customer management and wherein the updated CRM data is shared with the content providers by the user's terminal.

8. A customer relationship management (CRM) server, comprising:

a log data collection unit which receives log data, including Internet address connection information on a plurality of web sites which a user's terminal is connected to via a communication network, from the user's terminal via the communication network;

a CRM data generation and update unit which generates user's CRM data using the log data initially received from the user's terminal through the log data collection unit, updates the user's CRM data using the log data received from the user's terminal in which the CRM data has been already generated, to track the user's internet activity using the user's internet address connection information, and stores the CRM data in a data storage unit;

a CRM data transmission unit which transmits the generated and updated CRM data to the user's terminal via the communication network such that the CRM data is stored in the user's terminal, and transmits the CRM data to a contents provider (CP) server via the communication network if a request for the CRM data is received from the CP server connected to the user's terminal via the communication network; and a data storage unit in which the CRM data generated and updated by the CRM data generation and update unit is stored, wherein the CRM data comprises user personal information required by content providers for customer management and wherein the updated CRM data is shared with the content providers by the user's terminal, and wherein the log data collection unit transmits a log transmission program, to be installed in the user's terminal, to the user's terminal via the communication network such that the user's terminal transmits the log data, including Internet address information associated with the user's terminal, to the CRM server.

9. The CRM server of claim 8, wherein the user's terminal is one of a personal computer (PC), a personal digital assistant (PDA), and a mobile phone.

10. A computer-readable media having embodied thereon a program enabling a computer to provide a service for managing customer relationship management (CRM) data, the service comprising:

receiving log data, including Internet address connection information on a plurality of web sites which a user's terminal is connected to via a communication network, from the user's terminal via the communication network;

generating user's CRM data using the log data initially received from the user's terminal and updating the user's CRM data using the log data received from the user's terminal in which the CRM data has been already generated, to track the user's internet activity using the user's internet address connection information; and transmitting the generated and updated CRM data to the user's terminal via the communication network such that the CRM data is stored in the user's terminal, wherein the CRM data comprises user personal information required by content providers for customer management and wherein the updated CRM data is shared with the content providers by the user's terminal, and wherein the service further comprises transmitting a log transmission program, to be installed in the user's terminal, to the user's terminal via the communication network such that the user's terminal transmits the log data, including Internet address information associated with the user's terminal, to a CRM server.

11. A computer-readable media having embodied thereon a program enabling a computer to provide a service for managing customer relationship management (CRM) data, the service comprising:

receiving log data, including Internet address connection information on a plurality of web sites which a user's terminal is connected to via a communication network, from the user's terminal via the communication network;

generating, updating, and storing user's CRM data using the log data, to track the user's internet activity using the user's internet address connection information;

transmitting the CRM data to the user's terminal via the communication network such that the CRM data is stored in the user's terminal;

transmitting the stored CRM data to a contents provider (CP) server via the communication network if a request for the CRM data is received from the CP server connected to the user's terminal via the communication network; and transmitting a log transmission program, to be installed in the user's terminal, to the user's terminal via the communication network such that the user's terminal transmits the log data, including Internet address information associated with the user's terminal, to a CRM server, wherein the CRM data comprises user personal information required by content providers for customer management and wherein the updated CRM data is shared with the content providers by the user's terminal.

12. A computer-readable media having embodied thereon a program enabling a computer to provide a service for managing customer relationship management (CRM) data, the service comprising:

receiving log data, including Internet address connection information on a plurality of web sites which a user's terminal is connected to via a communication network, from the user's terminal via the communication network through a CRM server;

generating, updating, and storing user's CRM data using the log data through the CRM server, to track the user's internet activity using the user's internet address connection information;

transmitting the CRM data to the user's terminal via the communication network such that the CRM data is stored in the user's terminal through the CRM server;

requesting the user's terminal for the CRM data via the communication network if a request for contents is received from the user's terminal via the communication network through the CP server;

transmitting the contents to the user's terminal via the communication network if the requested CRM data is received from the user's terminal via the communication network through the CP server;

transmitting a log transmission program, to be installed in the user's terminal, to the user's terminal via the communication network such that the user's terminal transmits the log data, including Internet address information associated with the user's terminal, to a CRM server, wherein the CRM data comprises user personal information required by content providers for customer management and wherein the updated CRM data is shared with the content providers by the user's terminal.

* * * * *